United States Patent
Chen et al.

(10) Patent No.: US 11,246,139 B2
(45) Date of Patent: Feb. 8, 2022

(54) METHODS AND APPARATUS FOR CONTROL DETECTING AND DL/UL FORMAT PROCESSING

(71) Applicant: MediaTek Singapore Pte. Ltd., Singapore (SG)

(72) Inventors: Tao Chen, Beijing (CN); Hua-min Chen, Beijing (CN); Pei-Kai Liao, Mingjian Xiang (TW); Jianwei Zhang, Beijing (CN); Wenze Qu, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 296 days.

(21) Appl. No.: 16/310,982

(22) PCT Filed: Sep. 30, 2017

(86) PCT No.: PCT/CN2017/104847
§ 371 (c)(1),
(2) Date: Dec. 18, 2018

(87) PCT Pub. No.: WO2018/059584
PCT Pub. Date: Apr. 5, 2018

(65) Prior Publication Data
US 2020/0322938 A1    Oct. 8, 2020

(30) Foreign Application Priority Data
Sep. 30, 2016  (WO) ................ PCT/CN2016/101229

(51) Int. Cl.
*H04W 4/00*        (2018.01)
*H04W 72/04*       (2009.01)
(Continued)

(52) U.S. Cl.
CPC ..... *H04W 72/0493* (2013.01); *H04J 13/0062* (2013.01); *H04L 5/0094* (2013.01);
(Continued)

(58) Field of Classification Search
CPC .......... H04W 72/0493; H04W 72/005; H04W 72/0406; H04W 72/0446; H04W 72/0453
See application file for complete search history.

(56) References Cited

U.S. PATENT DOCUMENTS

2011/0274074 A1* 11/2011 Lee ...................... H04L 5/0053
                                                         370/329
2014/0105156 A1    4/2014 Jang et al.
(Continued)

FOREIGN PATENT DOCUMENTS

CN        102123524 A      7/2011
CN        103703706 A      4/2014
(Continued)

OTHER PUBLICATIONS

Extended European Search Report dated Mar. 16, 2020 in Patent Application No. 17855034.9, 9 pages.
(Continued)

*Primary Examiner* — Abdelnabi O Musa
(74) *Attorney, Agent, or Firm* — Oblon, McClelland, Maier & Neustadt, L.L.P.

(57) ABSTRACT

Aspects of the disclosure provide an apparatus that includes a receiving circuit and a processing circuit. The receiving circuit is configured to receive signals transmitted from a second apparatus to the apparatus and generate digital samples in response to the received signals. The signals have a plurality of resource elements. The processing circuit is configured to receive the digital samples, process the digital samples to generate symbols carried by the resource elements, detect control channel assistance information at a predetermined position of the resource elements and detect control information based on the detection of the control channel assistance information.

16 Claims, 5 Drawing Sheets

(51) Int. Cl.
*H04L 5/00* (2006.01)
*H04W 72/00* (2009.01)
*H04J 13/00* (2011.01)

(52) U.S. Cl.
CPC ....... *H04W 72/005* (2013.01); *H04W 72/042* (2013.01); *H04W 72/0406* (2013.01); *H04W 72/0446* (2013.01); *H04W 72/0453* (2013.01); *H04W 72/0466* (2013.01)

(56) References Cited

U.S. PATENT DOCUMENTS

| | | |
|---|---|---|
| 2014/0321414 A1 | 10/2014 | Chun et al. |
| 2015/0163771 A1* | 6/2015 | Kim .................... H04L 5/0048 370/329 |
| 2015/0365930 A1* | 12/2015 | Tabet .................. H04L 5/0053 370/329 |
| 2016/0006521 A1 | 1/2016 | Yoshimoto et al. |
| 2016/0044643 A1 | 2/2016 | Kim et al. |
| 2016/0100422 A1* | 4/2016 | Papasakellariou .... H04L 1/1861 370/329 |
| 2016/0192331 A1* | 6/2016 | Liang .................. H04L 5/0048 370/329 |
| 2016/0197715 A1* | 7/2016 | Papasakellariou .... H04L 5/0048 370/329 |
| 2017/0079022 A1 | 3/2017 | Kim et al. |
| 2018/0279375 A1* | 9/2018 | Jeon .................. H04W 74/0833 |
| 2019/0053120 A1* | 2/2019 | Park .................... H04W 76/27 |
| 2020/0127773 A1* | 4/2020 | Papasakellariou .... H04L 1/1822 |

FOREIGN PATENT DOCUMENTS

| | | |
|---|---|---|
| EP | 2 966 885 A | 1/2016 |
| EP | 3 026 946 A1 | 6/2016 |

OTHER PUBLICATIONS

"Other Control Channels for E-PDCCH" Research in Motion, UK Limited, 3GPP TSG RAN WG1 Meeting # 69; R1-122724, XP050600907, May 12, 2012, pp. 1-4.

International Search Report and Written Opinion dated Jan. 4, 2018, in PCT/CN2017/104847, filed Sep. 30, 2017.

Office Action dated Oct. 3, 2018 in Taiwan Patent Application No. 106133626 (with English translation of categories of cited documents).

* cited by examiner

METHODS AND APPARATUS FOR CONTROL DETECTING AND DL/UL FORMAT PROCESSING

CROSS REFERENCE TO RELATED APPLICATIONS

This application claims priority from PCT Application Number PCT/CN2016/101229, entitled "DL/UL format determination within a subframe", filed on Sep. 30, 2016; the subject matter of which is incorporated herein by reference.

TECHNICAL FIELD

The disclosed embodiments relate generally to wireless communication, and, more particularly, to methods and apparatus for control channel detection.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless communication network, a network provider can use a shared channel to communicate with one or more user equipment (UE). In an example, the network provider provides downlink control information of the shared channel to the one or more user equipment. Then the one or more user equipment can receive data transmitted by the shared channel according to the downlink control information.

SUMMARY

Aspects of the disclosure provide an apparatus that includes a receiving circuit and a processing circuit. The receiving circuit is configured to receive signals transmitted from a second apparatus to the apparatus and generate digital samples in response to the received signals. The signals have a plurality of resource elements. The processing circuit is configured to receive the digital samples, process the digital samples to generate symbols carried by the resource elements, detect control channel assistance information at a predetermined position of the resource elements and detect control information based on the detection of the control channel assistance information.

In an embodiment, the processing circuit is configured to skip a search of the control information in response to a detection success of the control channel assistance information, and is configured to start a search of the control information in response to a detection failure of the control channel assistance information.

In another embodiment, the processing circuit is configured to skip a search of the control information in response to a detection failure of the control channel assistance information, and start a search of the control information based on the control channel assistance information in response to a detection success of the control channel assistance information.

In an example, the processing circuit is configured to determine a position region of the resource elements based on the control channel assistance information, and search the position region for the control information.

Aspects of the disclosure provide a method of communication. The method includes receiving, at a first apparatus, signals transmitted from a second apparatus. The signals have a plurality of resource elements. The method further includes generating digital samples in response to the received signals, processing the digital samples to generate symbols carried by the resource elements, detecting control channel assistance information at a predetermined position of the resource elements, and detecting control information based on the detection of the control channel assistance information.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
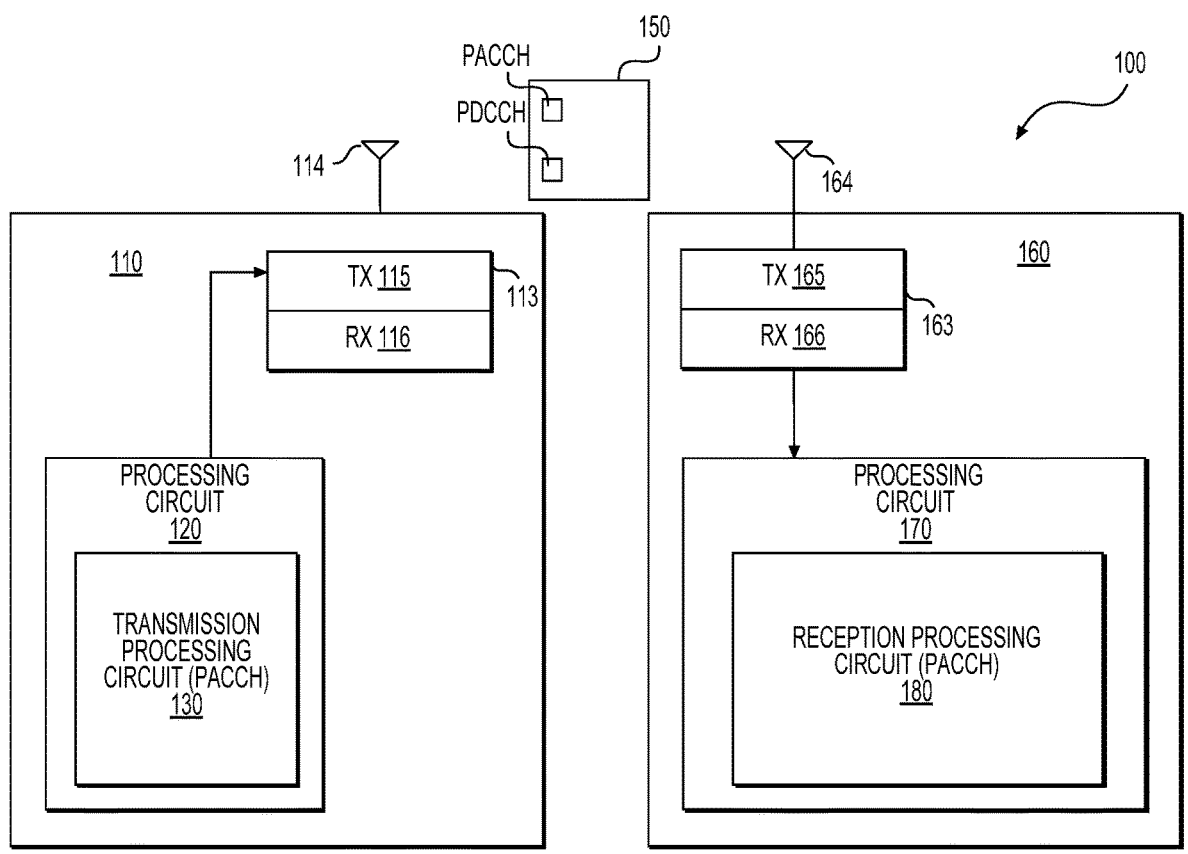
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a first electronic device 110 that communicates with a second electronic device 160 and other devices (not shown) using a shared channel. To use the shared channel to communicate with the second electronic device 160, the first electronic device 110 is configured to use a physical downlink control channel (PDCCH) for the second electronic device 160 to provide control information to the second electronic device 160, and to use control channel assistance information to assist a detection of the PDCCH by the second electronic device 160. The second electronic device 160 is configured to detect the control channel assistance information first, and then to detect the PDCCH based on the control channel assistance information.

The communication system 100 can be any suitable wireless communication system that uses suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), a New Radio (NR) access technology, a wireless local area network (WLAN), and the like.

In an embodiment, the first electronic device 110 is an interface node, such as a base transceiver station, a Node B, an evolved Node B, and the like, in a telecommunication service provider. The first electronic device 110 includes hardware components and software components configured to enable wireless communications of the first electronic device 110 with the second electronic device 160 and the other devices that have subscribed services of the telecommunication service provider. The first electronic device 110 is suitably coupled with other nodes, such as core nodes in a backbone of the telecommunication service provider, other interface nodes of the telecommunication service provider, and the like.

Further, in an embodiment, the second electronic device 160 and the other devices are terminal devices. The other devices can be similarly configured as the second electronic device 160. In an example, a terminal device is user equipment (UE), such as a cell phone, a smart phone, a tablet computer, a laptop, a wearable device and the like that is used by an end-user for mobile telecommunication. In another example, a terminal device is a stationary device, such as a desktop computer. In another example, a terminal device is a machine type communication device, such as a wireless sensor, an Internet of things (IoT) device and the like.

According to an aspect of the disclosure, the first electronic device 110 is configured to use a shared channel in the physical layer to transmit information, such as data and the like, to the second electronic device 160 and the other devices. In an example, the shared channel to transmit information from the first electronic device 110 to the second electronic device 160 and the other devices is referred to as a physical downlink shared channel (PDSCH). The control information is referred to as downlink control information (DCI). The DCI is carried by the physical channel PDCCH.

In an embodiment, the shared channel is configured to support time division multiplexing (TDM) and/or frequency division multiplexing (FDM).

In the frequency domain, in an example, sub-carriers are defined in the frequency domain according to a sub-carrier spacing. In an example, a carrier of 20 MHz bandwidth can include 1200 sub-carriers according to 15 KHz sub-carrier spacing. In another example, a carrier of 160 MHz bandwidth can include 2400 sub-carriers according to 60 KHz sub-carrier spacing. Further, in an example, virtual carrier (VC) can be used. For example, resources (frequency spectrum) in frequency domain are combined to form virtual carriers. The virtual carriers can have different bandwidths.

In the time domain, in an example, the first electronic device 110 is configured to structure transmission in the time duration as radio frames. In an example, each radio frame is 10 ms long and consists of ten sub-frames of 1 ms each. In another example, each radio frame is 10 ms long and consists of forty sub-frames of 0.25 ms each. A sub-frame can be further divided into for example 2 time slots, and a time slot can be divided into 7 symbol periods in an example.

In an embodiment, transmission resources of a shared channel are allocated in time and frequency domains. For example, in the two dimensional time and frequency domain, a resource element (RE) is made up of a symbol in the time domain and a sub-carrier in the frequency domain. In an example, a resource element group (REG) includes four resource elements in a same OFDM symbol period.

According to an aspect of the disclosure, the first electronic device 110 is configured to allocate transmission resources of a shared channel (e.g., one or more sub-frames) for data and control information respectively to the second electronic device 160 and the other devices, and use control channel assistance information to assist the second electronic device 160 and the other devices to detect the respective control information.

It is noted that, in an example, with the help of the control channel assistance information, the transmission resources for the control information are allocated with flexibility, thus the control information occupies less transmission resources, and the saved transmission resources can be used for data transmission. In another example, with the help of the control channel assistance information, the recipient device, such as the second electronic device 160 can detect the respective control information with ease and high reliability. With the help of the control channel assistance information, the second electronic device 160 can avoid or reduce unnecessary blind detection of the control information, and save power in an example.

In an embodiment, the transmission resources for the control information are flexibly allocated in time and/or frequency domains. In an example, the number of symbol periods allocated for the control information depends on system bandwidth. In an example, when a carrier has bandwidth of 5 MHz (e.g., the system bandwidth is 5 MHz), 2 OFDM symbol periods of the carrier are allocated to carry the control information. In another example, when a carrier has a bandwidth of 10 MHz, or 20 MHz, 1 OFDM symbol period of the carrier is allocated to carry the control information.

In another example, virtual carriers can have different bandwidths. In the example, the number of symbol periods allocated for the control information in a virtual carrier can vary based on the bandwidth of the virtual carrier.

In another example, control regions can be aggregated based on aggregation of virtual carriers. For example, when a first virtual carrier and a second virtual carrier are allocated to the second electronic device 160, the first virtual carrier and the second virtual carrier can be aggregated. The number of symbol periods allocated for the control information depends on the aggregated bandwidth of the first virtual carrier and the second virtual carrier, and is the same for the first virtual carrier and the second virtual carrier.

It is noted that a virtual carrier can be cell specific virtual carrier or UE specific virtual carrier. In an example, when a virtual carrier is a cell specific virtual carrier (e.g., specific for the first electronic device 110), the virtual carrier is a broadcasting virtual carrier. In another example, when a virtual carrier is a UE specific virtual carrier (e.g., specific for the second electronic device 160), the virtual carrier is unicasting virtual carrier to for example the second electronic device 160.

In an embodiment, different PDCCHs in a subframe can have different aggregation levels. In an example, control information is stored in the unit of control channel element (CCE). Each CCE includes 9 REGs. The CCEs are indexed across the OFDM symbol periods allocated to the control information. In an example, the number of CCEs in a PDCCH is called aggregation level. Each PDCCH includes a DCI, and the size of the DCI determines the aggregation level of the PDCCH. Further, a position of a PDCCH depends on an aggregation level of the PDCCH. In an example, a PDCCH with an aggregation level N (N is a positive integer) starts at a specific CCE with an index that is divisible by N (index mod N=0). For example, a PDCCH with aggregation level 4 starts at CCE index 0, 4, 8, 12, 16, etc.

According to an aspect of the disclosure, the first electronic device 110 is configured to allocate transmission resources in a subframe to PDCCHs, and to include control channel assistance information, such as in the form of corresponding physical assistant control channels (PACCHs) to the PDCCHs, in the subframe to assist detection of one or more PDCCHs at a recipient device, such as the second electronic device 160.

According to an aspect of the disclosure, a PACCH can be used in various modes to carry various control channel assistance information. In an embodiment, an existence of a PACCH for the second electronic device 160 indicates whether a PDCCH and/or a reference signal (RS) for demodulation exists for the second electronic device 160. In an example, the first electronic device 110 is configured to include a PACCH for the second electronic device 160 in a subframe when the subframe does not include a PDCCH (and/or a RS for demodulation) for the second electronic device 160, and is configured not to include a PACCH for the second electronic device 160 in a subframe when the subframe includes a PDCCH (and/or a RS for demodulation) for the second electronic device 160.

In another example, the first electronic device 110 is configured to include a PACCH for the second electronic device 160 in a subframe when the subframe includes a PDCCH (and/or a RS for demodulation) for the second electronic device 160, and is configured not to include a PACCH for the second electronic device 160 in a subframe when the subframe does not include a PDCCH (and/or a RS for demodulation) for the second electronic device 160.

In the embodiment, when the second electronic device 160 receives a subframe, the second electronic device 160 can detect an existence of a PACCH for the second electronic device 160 in the subframe, and then determine an existence of a PDCCH in the subframe based on the existence of the PDCCH. In an example, when the second electronic device 160 determines that no PDCCH for the second electronic device 160 exists in the subframe, the second electronic device 160 can skip a search process for the PDCCH, and enter a power saving mode to save power.

In time domain, a PACCH can be transmitted within one basic time unit by default, such as one OFDM symbol. In another embodiment, the PACCH can be transmitted over N predetermined basic time units (e.g., several OFDM symbols).

In another embodiment, the existence of a PACCH for the second electronic device 160 indicates that a PDCCH for the second electronic device 160 exists in a predetermined region (e.g., one or several transmission time intervals (TTIs)) in time and/or frequency domain. In an example, the first electronic device 110 includes a PACCH for the second electronic device 160 in a subframe to indicate that a PDCCH for the second electronic device 160 is located in a specific region of the time domain that is predetermined. In an example, the existence of the PACCH is indicative of a specific start point in the time domain for PDCCH detection. In another example, the existence of the PACCH is indicative of a specific start point (e.g., start symbol period) and a specific stop point (e.g., stop symbol period) in the time domain for PDCCH detection. For example, the first electronic device 110 includes a PACCH at a position M in the time domain (e.g., M is a symbol period in the subframe). In an example, when the second electronic device 160 detects the PACCH at the position M, the second electronic device 160 starts a search process at a position M+K in the time domain (e.g., M+K symbol period), where K is a positive integer or zero. In another example, when the second electronic device 160 detects the PACCH at the position M, the second electronic device 160 starts a search process at a position M+K in the time domain (e.g., M+K symbol period) and stops the search process at a position M+P in the time domain (e.g., M+P symbol period), where K is positive integer or zero and P is larger than K.

It is noted that, in an example, M, K and P are predetermined and known by the first electronic device 110 and the second electronic device 160.

In addition, the PACCH can carry more information to assist a search process. In an embodiment, an existence of a PACCH for the second electronic device 160 in a subframe is indicative of an existence of a PDCCH for the second electronic device 160, and the PACCH carries additional information to assist a search process of the PDCCH.

In an example, the first electronic device 110 includes, in the PACCH, a size information of a DCI, and the DCI is carried by the PDCCH. Thus, the second electronic device 160 can determine an aggregation level N of the PDCCH based on the size information, and search CCEs with indexes that are divisible by the aggregation level N and are possible start position of the PDCCH. Thus, the CCEs with indexes that are not divisible by the aggregation level N can be skipped, and the second electronic device 160 can detect the PDCCH with fast speed.

In another example, the first electronic device 110 includes, in the PACCH, type information, such as a fallback DCI type and the like, and the DCI is carried by the PDCCH. Thus, the second electronic device 160 can determine the size information of the DCI based on the type information, and determine an aggregation level N of the PDCCH based on the size information. Then the second electronic device 160 can search CCEs with indexes that are divisible by the aggregation level N and are possible start position of the PDCCH in an example. Thus, the CCEs with indexes that are not divisible by the aggregation level N can be skipped, and the second electronic device 160 can detect the PDCCH with fast speed.

It is noted that a PACCH can be UE-specific, group-specific or cell specific. Group specific PACCH can reduce the signaling overhead by avoidance of PACCH transmission for each UE. For example, in case of massive machine type communications (mMTC) service, group scheduling is applied for data scheduling, and group PACCH can be used for PDCCH detection. In an embodiment, each UE in the group detects the PDCCH since the group PACCH does not specify which UE in the group is the target for the subframe. In an embodiment, a cell specific PACCH can be used for scheduling detection of a common data channel for UEs in the cell.

It is noted that the PACCH can be implemented using any suitable technique. In an embodiment, a PACCH is implemented using a sequence. In an example, a Zadoff-Chu (ZC) sequence that has a relatively high auto-correlation and relatively low cross-correlation is used for PACCH implementation. In another embodiment, the PACCH includes a sequence that is generated via a radio network temporary identifier (RNTI) value. The RNTI value can be UE-specific, such as a cell radio network temporary identifier (C-RNTI), or group-specific, such as a transmit power control radio network temporary identifier (TPC-RNTI), or cell-specific, such as a system information radio network temporary identifier (SI-RNTI). In yet another embodiment, the PACCH is implemented as a coded channel.

In an embodiment, transmission mechanism information of one or more PACCHs, such as position in time and/or frequency domain, an implementation mode, and the like, is determined by a network (e.g., a core node or an interface node in the network). The network can determine the transmission mechanism information for various scenarios to achieve various benefits under the scenarios. In an example, when a relatively large amount of data is communicated between the first electronic device 110 and the network, the network selects a transmission mechanism that uses an existence of PACCH to indicate a non-existence of the PDCCH, and uses a non-existence of PACCH to indicate an existence of the PDCCH. Thus, the network reduces transmission resource allocation for each PACCH under the scenario.

In another example, when a relatively small amount of data is communicated between the first electronic device 110 and the network, for example the first electronic device 110 is in an idle state, the network selects a transmission mechanism that uses an existence of PACCH to indicate an existence of the PDCCH, and uses a non-existence of PACCH to indicate a non-existence of the PDCCH.

In another example, when the communication channel between the first electronic device 110 and the second electronic device 160 lacks reliability (e.g., a relatively long distance between the first electronic device 110 and the second electronic device 160), the network selects a transmission mechanism that uses an existence of PACCH to indicate an existence of the PDCCH, and uses a non-existence of PACCH to indicate a non-existence of the PDCCH. Thus, in an example, when the second electronic device 160 fails to detect a PACCH due to a relatively low reliability of the communication channel, the second electronic device 160 can enter power saving mode (e.g., go to sleep/idle state).

In another example, when reliability of the communication channel between the first electronic device 110 and the second electronic device 160 reaches a fairly high level, the network selects a transmission mechanism that uses an existence of PACCH to indicate a non-existence of the PDCCH, and uses a non-existence of PACCH to indicate an existence of the PDCCH. Thus, the network reduces transmission resource allocation for each PACCH under the scenario.

In an embodiment, the first electronic device 110 informs the determined transmission mechanism information of the one or more PACCHs to the second electronic device 110. In an example, the first electronic device 110 can include the transmission mechanism information of the one or more PACCHs in a pilot signal to broadcast the transmission mechanism information to inform UEs in a cell, thus when the second electronic device 160 is in the cell, the second electronic device 160 receives the transmission mechanism information, and uses the transmission mechanism information to detect the one or more PACCHs. In another example, the first electronic device 110 can use dedicated signaling to inform for example the second electronic device 160. In an example, the first electronic device 110 includes the transmission mechanism information of a PACCH in a message during radio resource control (RRC) connection setup. Thus, the second electronic device 160 receives the transmission mechanism information, and uses the transmission mechanism information to detect the one or more PACCHs. Please note that, the PACCH transmission mechanism can also be disabled. And the different PACCH transmission mechanism can be configured by the network.

In the FIG. 1 example, the first electronic device 110 transmits a radio frame that includes a sub-frame 150. The sub-frame 150 includes a PDCCH for the second electronic device 160, and includes a PACCH to provide control channel assistance information to assist the second electronic device 160 to detect the PDCCH. It is noted that, in an example, the sub-frame 150 in the downlink carries downlink control information (DCI) about data transmission in the current sub-frame and further transmissions.

Specifically, in the FIG. 1 example, the first electronic device 110 includes a first transceiver 113 and a first processing circuit 120 coupled together. In the example, the first processing circuit 120 includes a transmission processing circuit 130. The transmission processing circuit 130 is configured to prepare a subframe (e.g., the subframe 150) with control channel assistance information, such as in the form of a PACCH, for a corresponding PDCCH in the subframe. The first electronic device 110 can include other suitable components (not shown), such as processors, memory, and the like. In an embodiment, the first electronic device 110 may include a memory which stores program instructions and/or data to control the operations of the first electronic device 110.

The second electronic device 160 includes a second transceiver 163 and a second processing circuit 170 coupled together. The second processing circuit 170 includes a reception processing circuit 180. The reception processing circuit is configured to detect control channel assistance information in a received subframe, such as in the form of a PACCH, and detect a corresponding PDCCH in the received subframe based on the control channel assistance information. The second electronic device 160 can include other suitable components (not shown), such as processors, memory, and the like. In an embodiment, the second electronic device 160 may include a memory which stores program instructions and/or data to control the operations of the second electronic device 160.

It is noted that the first processing circuit 120 can include other suitable components, such as a reception processing circuit (not shown) and the like. Similarly, the second processing circuit 170 can include other suitable components, such as a transmission processing circuit (not shown) and the like.

The first transceiver 113 is configured to receive and transmit wireless signals. In an example, the first transceiver 113 includes a receiving circuit RX 116 and a transmitting circuit TX 115. The receiving circuit RX 116 is configured to generate electrical signals in response to captured electromagnetic waves by an antenna 114, and process the electrical signals to extract digital samples from the electrical signals. For example, the receiving circuit RX 116 can filter, amplify, down convert, and digitalize the electrical signals to generate the digital samples. The receiving circuit RX 116 can provide the digital samples to the first processing circuit 120 for further processing.

In an example, the transmitting circuit TX 115 is configured to receive digital stream (e.g., output samples) from the first processing circuit 120, process the digital stream to generate radio frequency (RF) signals, and cause the antenna 114 to emit electromagnetic waves in the air to carry the digital stream. In an example, the transmitting circuit TX 115 can convert the digital stream to analog signals, and amplify, filter and up-convert the analog signals to generate the RF signals.

According to an aspect of the disclosure, the transmission processing circuit 130 is configured to receive downlink control information for one or more devices, encode the downlink control information in one or more PDCCHs, and generate corresponding control channel assistance information for the one or more PDCCHs. Further, the transmission processing circuit 130 is configured to suitably encode data, and generate a digital stream (e.g., output samples) in response to the encoded data, downlink control information and the control channel assistance information.

In an embodiment, the transmission processing circuit 130 is configured to receive downlink control information message for an electronic device, such as for the second electronic device 160, or for a group of second electronic devices, and perform channel coding on the downlink control information to generate encoded control bits. In an example, the transmission processing circuit 130 is configured to insert cyclic redundancy check (CRC), and conduct rate matching and the like to generate the encoded control bits. In an example, the transmission processing circuit 130 masks the CRC bits with an identifier, such as an identifier of the second electronic device 160, a system information identifier, and the like.

Then, in an example, the transmission processing circuit 130 is configured to map the encoded control bits to one or more resource elements according to the PDCCH format. For example, the transmission processing circuit 130 is configured to perform quadrature phase shift keying (QPSK) modulation, and generate orthogonal frequency-division multiplexing (OFDM) symbols for the encoded control bits. Then, the transmission processing circuit 130 can map the OFDM symbols into resource elements allocated to the second electronic device 160.

It is noted that the transmission processing circuit 130 can encode DCI messages for respective second electronic devices into resource elements that are respectively allocated to the second electronic devices.

Further, according to an aspect of the disclosure, the transmission processing circuit 130 is configured to map control channel assistance information to one or more resource elements according to, for example, the transmission mechanism information of PACCH. In an example, the transmission processing circuit 130 is configured to map a bit that is indicative of an existence or non-existence of a PDCCH to an OFDM symbol at a specific position. In another example, the transmission processing circuit 130 is configured to map a sequence that is indicative of the control channel assistance information to OFDM symbols at a specific position. In another example, the transmission processing circuit 130 is configured to map a value that is indicative of DCI size information or DCI type information to OFDM symbols at a specific position.

According to an aspect of the disclosure, the transmission processing circuit 130 can also process data according to suitable channel coding technique, such as error detection coding technique, rate matching coding technique, low density parity check (LDPC) coding technique, polar coding technique and the like. The processed data is suitably modulated and multiplexed. In an example, the data can be modulated using suitable modulation technique, such as quadrature phase shift keying (QPSK) and the like, and can be multiplexed using suitable multiplexing technique, such as orthogonal frequency-division multiplexing (OFDM) and the like. Then, the modulated symbols are interleaved and mapped to physical resource elements (REs) allocated for data transmission.

The transmission processing circuit 130 then generates the digital stream based on the resource element mapping results of the data processing, the downlink control information processing and the control channel assistance information processing.

It is noted that the transmission processing circuit 130 can perform other suitable functions, such as scrambling, and the like. It is noted that the transmission processing circuit 130 can be implemented using various techniques. In an example, the transmission processing circuit 130 is implemented as integrated circuits. In another example, transmission processing circuit 130 is implemented as one or more processors executing software instructions.

The second transceiver 163 is configured to receive and transmit wireless signals. In an example, the second transceiver 163 includes a receiving circuit RX 166 and a transmitting circuit TX 165. The receiving circuit RX 166 is configured to generate electrical signals in response to captured electromagnetic waves by an antenna 164, and process the electrical signals to extract digital samples from the electrical signals. For example, the receiving circuit RX 166 can filter, amplify, down convert, and digitalize the electrical signals to generate the digital samples. The receiving circuit RX 166 can provide the digital samples to the second processing circuit 170 for further processing.

In an example, the transmitting circuit TX 165 is configured to receive a digital stream (e.g., output samples) from the second processing circuit 170, process the digital stream to generate radio frequency (RF) signals, and cause the antenna 164 to emit electromagnetic waves in the air to carry the digital stream. In an example, the transmitting circuit TX 165 can convert the digital stream to analog signals, and amplify, filter and up-convert the analog signals to generate the RF signals.

According to an aspect of the disclosure, the reception processing circuit 180 is configured to receive the digital samples from the receiving circuit RX 166, process the digital samples to generate symbols, decode the symbols, detect control channel assistance information for the second electronic device 160, and extract the downlink control information for the second electronic device 160.

In an embodiment, the reception processing circuit 180 is configured to receive the digital samples, and perform demodulation on the digital samples to generate symbols for resource elements in the two-dimensional time frequency domain. Further, the reception processing circuit 180 is configured to decode one or more symbols at a specific position that is predetermined to detect the control channel assistance information for the second electronic device 160. Based on the control channel assistance information, the reception processing circuit 180 detects the PDCCH for the second electronic device 160 and decodes the PDCCH.

In an example, the control channel assistance information is indicative of non-existence of the PDCCH for the second electronic device 160, the reception processing circuit 180 skips a search process for the PDCCH, and the second electronic device 160 enters a power saving mode for a time duration (e.g., one or more subframe receiving and processing durations) to save power.

In an example, the control channel assistance is indicative of DCI size information, the reception processing circuit 180 is configured to determine an aggregation level for the PDCCH, and decode symbols at CCEs with indexes that are divisible by the aggregation level. In an example, for a CCE with an index that is divisible by the aggregation level, the reception processing circuit 180 is configured to collect the symbols according to the aggregation level, and attempt to decode the collected symbols. In an example, the PDCCH can have multiple formats. The reception processing circuit 180 can decode respectively according to the multiple formats. In another example, the second electronic device 160 can have multiple identifiers. The reception processing circuit 180 can de-mask CRC bits respectively according to the multiple identifiers. The reception processing circuit 180 can perform CRC decoding.

In an example, when the reception processing circuit 180 achieves a success in CRC decoding (e.g., no CRC error) for a CCE with an index that is divisible by the aggregation level, the reception processing circuit 180 determines that the PDCCH for the second electronic device 160 is detected.

Then, the reception processing circuit 180 can perform a full decoding to extract the control information and the data from the subframe for the second electronic device 160.

It is noted that the reception processing circuit 180 can be implemented using various techniques. In an example, the reception processing circuit 180 is implemented as integrated circuits. In another example, the reception processing circuit 180 is implemented as one or more processors executing software instructions.

It is also noted that while single antenna per device is used in the FIG. 1 example, the communication system 100 can be suitably modified to using multiple input, multiple output (MIMO) antenna technology.

Figure 2:
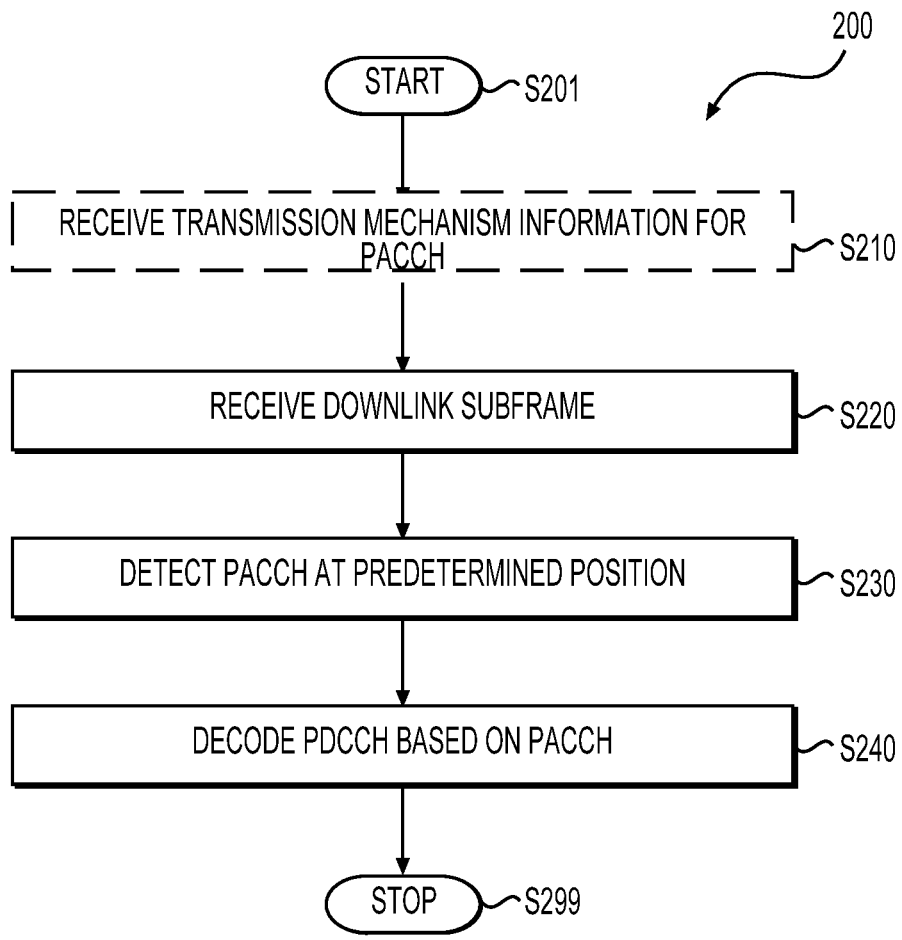
FIG. 2 shows a flow chart outlining a process example 200 according to an embodiment of the disclosure.

FIG. 2 shows a flow chart outlining a process example 200 according to an embodiment of the disclosure. In an example, the process 200 is executed by the second electronic device 160 in the FIG. 1 example. The process starts at S201 and proceeds to S210.

At S210, transmission mechanism information for PACCH is received. In an example, the second electronic device 160 receives the transmission mechanism information from a pilot signal that is broadcasted for example by the first electronic device 110. For example, the PACCH is a group specific PACCH. In another example, the second electronic device 160 receives the transmission mechanism information during a radio resource control (RRC) connection setup and the PACCH is UE specific that is specific to the second electronic device 160.

At S220, wireless signals carrying a downlink subframe is received. In an example, the receiving circuit RX 166 generates electrical signals in response to captured electromagnetic waves by the antenna 164, and processes the electrical signals to extract digital samples from the electrical signals. For example, the receiving circuit RX 166 can filter, amplify, down convert, and digitalize the electrical signals to generate digital frames.

At S230, PACCH is detected. In an example, the reception processing circuit 180 receives the digital samples, and performs demodulation on the digital samples to generate symbols for resource elements in the two dimensional time frequency domain. Further, the reception processing circuit 180 decodes symbols at one or more specific positions in the two dimensional time frequency domain, and detects information carried by the PACCH. The information carried by the PACCH can include an existence information of the PACCH, size information of a PDCCH, type information of the PDCCH, position information of the PDCCH, and the like.

At S240, PDCCH is decoded based on the detection of the PACCH. In an example, the PDCCH is decoded based on the existence of the PACCH. In another example, the PDCCH is decoded based the size information of the PDCCH. In an example, the PDCCH is decoded based on the type information of the PDCCH. In an example, the PDCCH is decoded based on the position information of the PDCCH. Then, the process proceeds to S299 and terminates.

It is noted that the process 200 can be suitably modified. In an example, a default transmission mechanism is configured in the communication system 100, and the step 210 can be skipped in the example.

Figure 3:
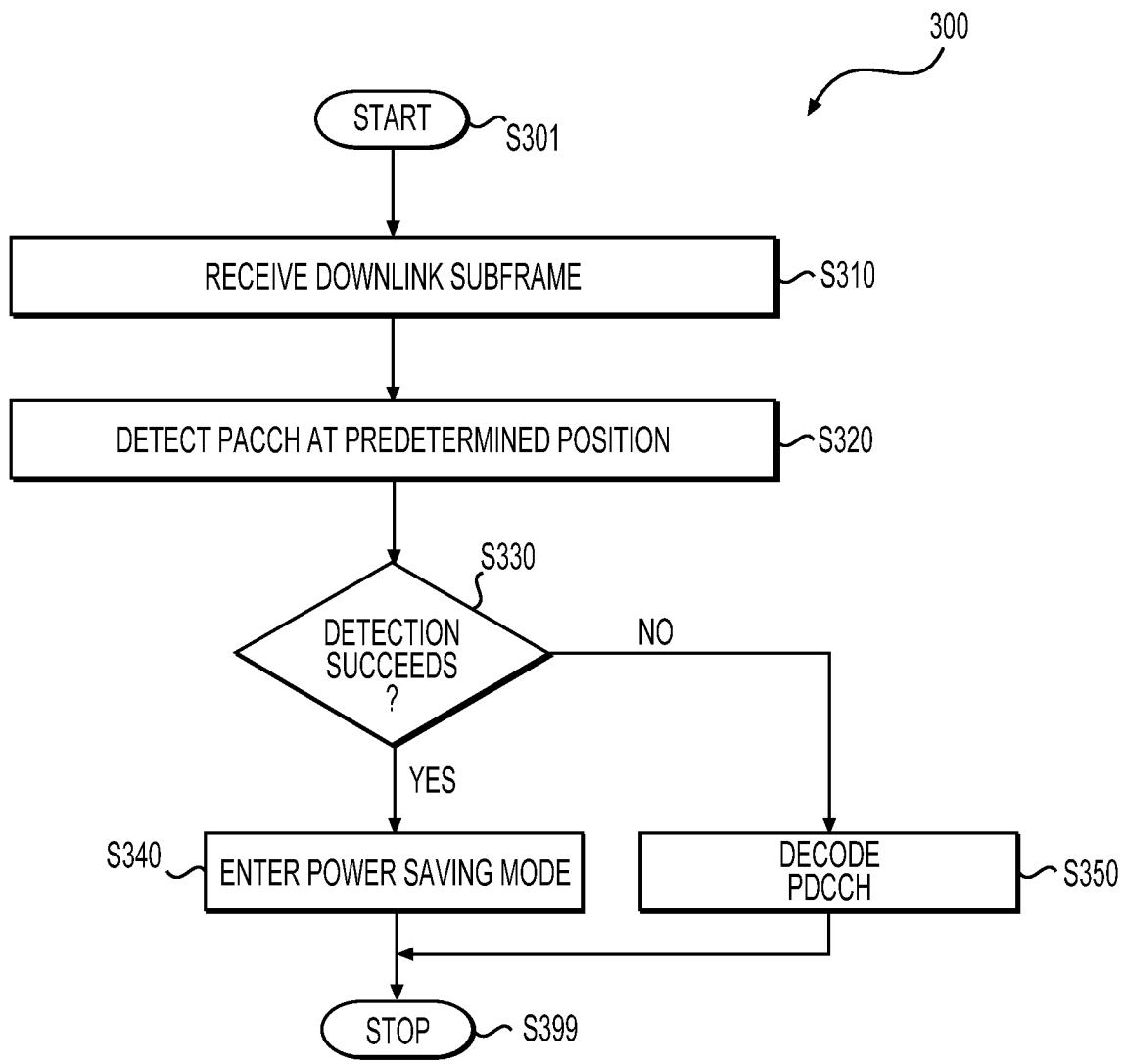
FIG. 3 shows a flow chart outlining a process example 300 according to an embodiment of the disclosure.

FIG. 3 shows a flow chart outlining a process example 300 according to an embodiment of the disclosure. In an example, the process 300 is executed by an electronic device, such as the second electronic device 160 in the FIG. 1 example. The process starts at S301 and proceeds to S310.

At S310, wireless signals carrying a downlink subframe is received. In an example, the receiving circuit RX 166 generates electrical signals in response to captured electromagnetic waves by the antenna 164, and processes the electrical signals to extract digital samples from the electrical signals. For example, the receiving circuit RX 166 can filter, amplify, down convert, and digitalize the electrical signals to generate digital frames.

At S320, PACCH is detected. In an example, the reception processing circuit 180 receives the digital samples, and perform demodulation on the digital samples to generate symbols for resource elements in the two-dimensional time frequency domain. Further, the reception processing circuit 180 decodes symbols at one or more specific positions that are predetermined in the two dimensional time frequency domain, and detects whether the PACCH exists in the subframe.

At S330, when the detection succeeds that the PACCH exists in the subframe, the process proceeds to S340; otherwise the process proceeds to S350.

At S340, the electronic device enters a power saving mode. In an example, the existence of the PACCH is indicative of non-existence of a corresponding PDCCH for the electronic device in the subframe, thus the electronic device can enter the power saving mode for a time duration, such as a time duration for decoding a subframe and the like. Then the process proceeds to S399 and terminates.

At S350, the electronic device decodes PDCCH. In an example, the non-existence of the PACCH is indicative of an existence of a PDCCH for the electronic device. Thus, in an example, the electronic device can perform for example blind detection of the PDCCH. Then, the process proceeds to S399 and terminates. According to an embodiment, the PACCH only carry existence information, and 1-bit indication is used by the PACCH.

In an embodiment, when the first electronic device 110 and the second electronic device 160 communicate a relatively large amount of data, the transmission mechanism that uses the existence of PACCH to indicate non-existence of the PDCCH is selected by a node at the network side, such as the first electronic device 110. Then, the first electronic device 110 includes PACCH for the second electronic device 160 in a subframe when PDCCH for the second electronic device 160 does not exist in the subframe. Thus, the second electronic device 160 can enter the power saving mode when PACCH is detected in a received subframe. In another example, the first electronic device 110 omits a PACCH in a subframe when PDCCH for the second electronic device 160 exists in the subframe. In the situation that the first electronic device 110 and the second electronic device 160 communicate a relatively large amount of data, a relatively small amount of resource elements is used for each PACCH.

In another embodiment, when reliability of the communication channel between the first electronic device 110 and the second electronic device 160 reaches a fairly high level, the transmission mechanism that uses the existence of PACCH to indicate non-existence of the PDCCH is selected by a node in the network, such as the first electronic device 110. The first electronic device 110 includes PACCH for the second electronic device 160 in a subframe when PDCCH for the second electronic device 160 does not exist in the subframe, and omits the PACCH in a subframe when PDCCH for the second electronic device 160 exists in the subframe. Thus, the second electronic device 160 can enter the power saving mode when PACCH is detected in a received subframe. In the situation that the second electronic device 160 fails to detect PACCH, the second electronic device 160 can further perform blind detection of the PDCCH.

Figure 4:
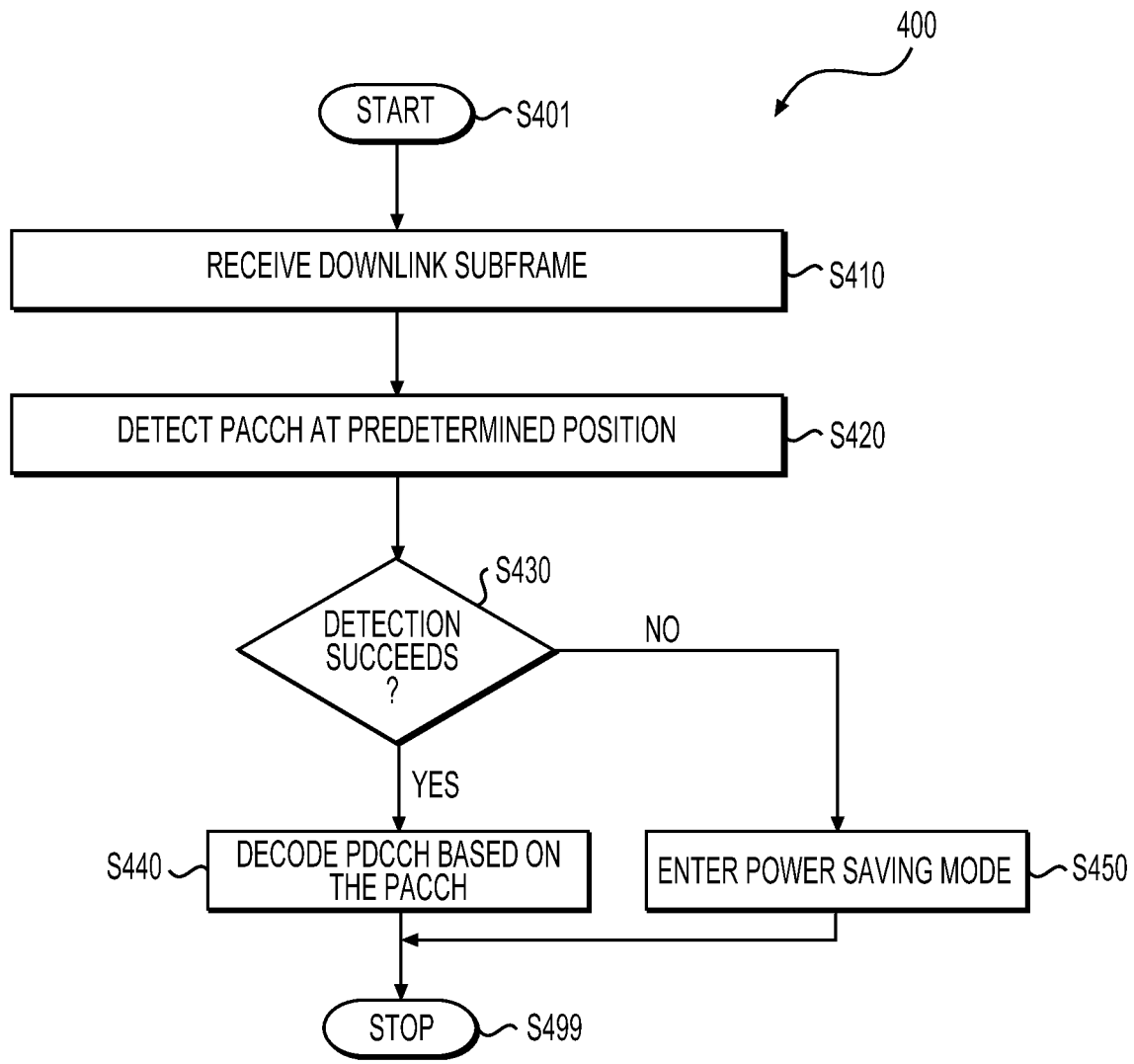
FIG. 4 shows a flow chart outlining a process example 400 according to an embodiment of the disclosure.

FIG. 4 shows a flow chart outlining a process example 400 according to an embodiment of the disclosure. In an example, the process 400 is executed by an electronic device, such as the second electronic device 160 in the FIG. 1 example. The process starts at S401 and proceeds to S410.

At S410, wireless signals carrying a downlink subframe is received. In an example, the receiving circuit RX 166 generates electrical signals in response to captured electromagnetic waves by the antenna 164, and processes the electrical signals to extract digital samples from the electrical signals. For example, the receiving circuit RX 166 can filter, amplify, down convert, and digitalize the electrical signals to generate digital frames.

At S420, PACCH is detected. In an example, the reception processing circuit 180 receives the digital samples, and performs demodulation on the digital samples to generate symbols for resource elements in the two dimensional time frequency domain. Further, the reception processing circuit 180 decodes symbols at one or more specific positions that are predetermined in the two dimensional time frequency domain, and detects whether a PACCH exists in the subframe.

At S430, when the detection succeeds, the process proceeds to S440; otherwise the process proceeds to S450.

At S440, the electronic device decodes PDCCH based on the PACCH. In an example, the existence of the PACCH is indicative of an existence of the PDCCH. Thus, in an example, the electronic device can perform for example detection of the PDCCH based on the information in the PACCH. The PACCH can carry various information, such as a size information of the PDCCH, a region information of the PDCCH, type information of the PDCCH, and the like to further assist the detection of the PDCCH. Then, the process proceeds to S499 and terminates.

At S450, the electronic device enters a power saving mode. In an example, the non-existence of the PACCH is indicative of non-existence of a corresponding PDCCH in the subframe, thus the electronic device can enter the power saving mode for a time duration, such as a time duration for decoding a subframe and the like. Then the process proceeds to S499 and terminates.

In an embodiment, when the first electronic device 110 and the second electronic device 160 communicate a relatively small amount of data, for example, the second electronic device 160 is idle or the second electronic device 160 is inactive, the transmission mechanism that uses the existence of PACCH to indicate the existence of the PDCCH is selected by a node in the network, such as the first electronic device 110. For example, the first electronic device 110 includes a PACCH for the second electronic device 160 in a subframe when a PDCCH for the second electronic device 160 exists in the subframe. Thus, the second electronic device 160 can enter a power saving mode when a PACCH is not detected in a received subframe. In another example, the first electronic device 110 omits a PACCH when PDCCH for the second electronic device 160 does not exist in a subframe.

Figure 5:
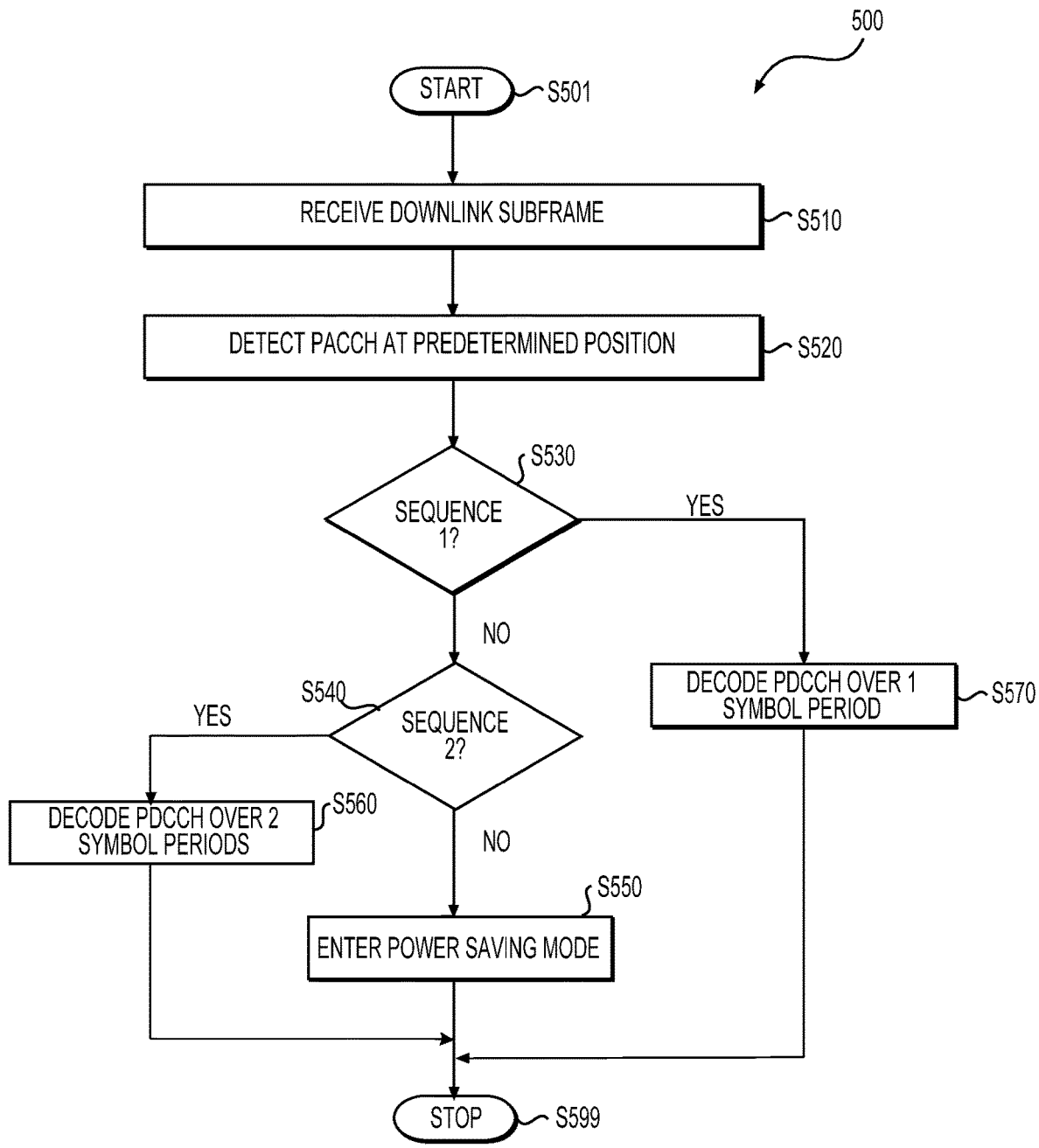
FIG. 5 shows a flow chart outlining a process example 500 according to an embodiment of the disclosure.

FIG. 5 shows a flow chart outlining a process example 500 according to an embodiment of the disclosure. In an example, the process 500 is executed by the second electronic device 160 in the FIG. 1 example. The process starts at S501 and proceeds to S510.

At S510, wireless signals carrying a downlink subframe is received. In an example, the receiving circuit RX 166 generates electrical signals in response to captured electromagnetic waves by the antenna 164, and processes the electrical signals to extract digital samples from the electrical signals. For example, the receiving circuit RX 166 can filter, amplify, down convert, and digitalize the electrical signals to generate digital frames.

At S520, PACCH is detected. In an example, the reception processing circuit 180 receives the digital samples, and perform demodulation on the digital samples to generate symbols for resource elements in the two dimensional time frequency domain. Further, the reception processing circuit 180 decodes symbols at one or more specific positions that are predetermined in the two dimensional time frequency domain to generate a decoded sequence.

At S530, the decoded sequence is compared with a first predetermined sequence. When the decoded sequence is the same as the first predetermined sequence, the process proceeds to S570; otherwise the process proceeds to S540.

At S540, the decoded sequence is compared with a second predetermined sequence. When the decoded sequence is the same as the second predetermined sequence, the process proceeds to S560; otherwise the process proceeds to S550.

At S550, the electronic device decides that the subframe does not include a PDCCH for the electronic device. The electronic device enters a power saving mode for a time duration, such as a time duration for decoding a subframe and the like. The process proceeds to S599 and terminates.

At S560, the electronic device decodes PDCCH over 2 OFDM symbol periods in the subframe. Then, the process proceeds to S599 and terminates.

At S570, the electronic device decodes PDCCH over 1 OFDM symbol period in the subframe.

In the FIG. 5 example, two sequences are pre-defined to respectively correspond to two regions for PDCCH detection. For example, the first sequence is pre-defined to correspond to a region of 1 OFDM symbol period, and the second sequence is pre-defined to correspond to a region of 2 OFDM symbol periods. When one symbol period in the subframe is allocated for control information, the first electronic device 110 can include the first sequence in the PACCH to inform the second electronic device 160. When two symbol periods are allocated for transmitting control information, the first electronic device 110 can include the second sequence in the PACCH to inform the second electronic device 160.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. An apparatus, comprising:
a receiving circuit configured to:
  receive downlink signals transmitted from a second apparatus to the apparatus over a plurality of resource elements; and
a processing circuit configured to:
  detect control channel assistance information in a form of a physical assistant control channel (PACCH) at a predetermined position of the resource elements based on the received downlink signals;
  receive control information in a form of a downlink control information (DCI) based on the detected control channel assistance information; and receive a physical downlink data channel based on the control information, wherein, when detecting the control channel assistance information, the processing circuit is further configured to either:
(i) skip a search of the control information in response to a detection success of the control channel assistance information, and start a search of the control information in response to a detection failure of the control channel assistance information; or
(ii) skip a search of the control information in response to a detection failure of the control channel assistance information, and start a search of the control information based on the control channel assistance information in response to a detection success of the control channel assistance information.

2. The apparatus of claim 1, wherein the processing circuit is further configured to:
determine a position region of the resource elements based on the control channel assistance information; and
search the position region for the control information.

3. The apparatus of claim 2, wherein the processing circuit is further configured to determine the position region associated with the detection success of the control channel assistance information.

4. The apparatus of claim 2, wherein the processing circuit is further configured to:
determine a first position region when the control channel assistance information includes a first sequence; and
determine a second position region when the control channel assistance information includes a second sequence.

5. The apparatus of claim 1, wherein the processing circuit is further configured to:
determine resource configuration for the control information based on the control channel assistance information; and
search the resource elements for control information based on the resource configuration.

6. The apparatus of claim 1, wherein the processing circuit is further configured to:
detect type information of the control information based on the control channel assistance information; and
search the resource elements based on the type information.

7. The apparatus of claim 1, wherein the processing circuit is further configured to detect the control channel assistance information in a form of a Zadoff-Chu (ZC) sequence.

8. The apparatus of claim 1, wherein the processing circuit is further configured to detect the control channel assistance information in a form of a sequence that is generated via an identifier of the apparatus.

9. A method of communication, comprising:
receiving, at a first apparatus, downlink signals transmitted from a second apparatus over a plurality of resource elements;
detecting control channel assistance information in a form of a physical assistant control channel (PACCH) at a predetermined position of the resource elements based on the received downlink signals;
receiving control information in a form of a downlink control information (DCI) based on the detected control channel assistance information; and
receiving a physical downlink data channel based on the control information, wherein, when detecting the control channel assistance information, the method further comprises either:
(i) skipping a search of the control information in response to a detection success of the control channel assistance information, and starting a search the control information in response to a detection failure of the control channel assistance information; or
(ii) skipping a search of the control information in response to a detection failure of the control channel assistance information, and starting a search of the control information based on the control channel assistance information in response to a detection success of the control channel assistance information.

10. The method of claim 9, wherein searching the control information based on the control channel assistance information in response to the detection success of the control channel assistance information comprises:
determining a position region of the resource elements based on the control channel assistance information; and
searching the position region for the control information.

11. The method of claim 10, wherein determining the position region of the resource elements based on the control channel assistance information comprises:
determining the position region associated with the detection success of the control channel assistance information.

12. The method of claim 10, wherein determining the position region of the resource elements based on the control channel assistance information comprises:
determining a first position region when e control channel assistance information includes a first sequence;
determining a second position region when the control channel assistance information includes a second sequence.

13. The method of claim 9, wherein searching the control information based on the control channel assistance information in response to the detection success of the control channel assistance information comprises:
determining resource configuration for the control information based on the control channel assistance information; and
searching the resource elements based on the resource configuration information.

14. The method of claim 9, wherein searching the control information based on the control channel assistance information in response to the detection success of the control channel assistance information comprises:
detecting type information of the control information based on the control channel assistance information; and
searching the resource elements based on the type information.

15. The method of claim 9, wherein detecting the control channel assistance information at the predetermined position of the resource elements further comprises:
detecting the control channel assistance information in a form of a Zadoff-Chu (ZC) sequence.

16. The method of claim 9, wherein detecting control channel assistance information at a predetermined position of the resource elements further comprises:
detecting the control channel assistance information in a form of a sequence that is generated via an identifier of the first apparatus.

* * * * *